Nov. 28, 1939.  N. FULTON  2,181,806
COIN HOLDER
Filed June 9, 1936  4 Sheets-Sheet 1
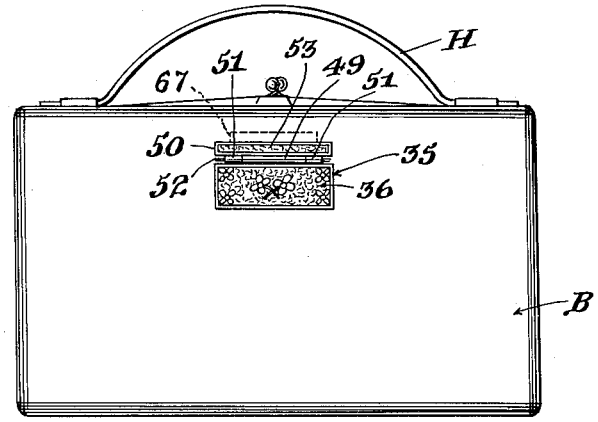
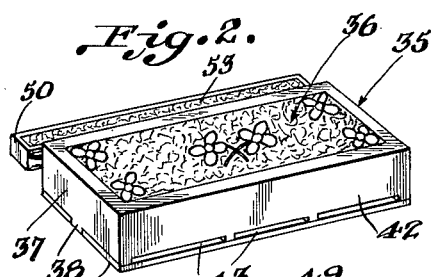
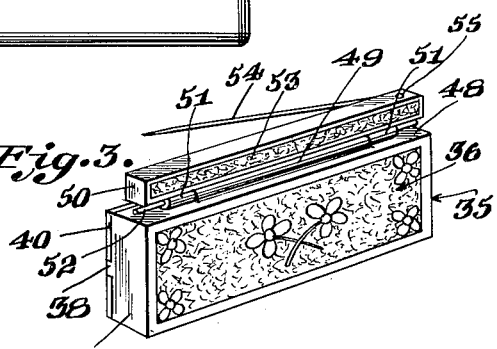
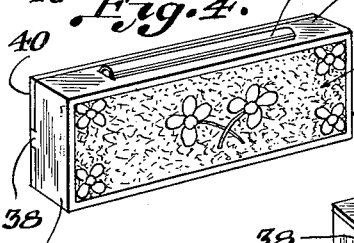
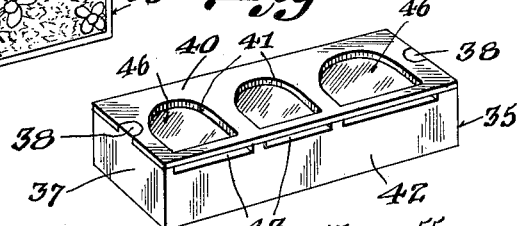
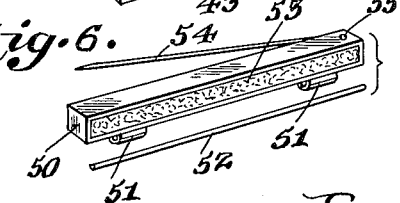
Inventor
Nell Fulton
By Emil F. Lange
Attorney Nov. 28, 1939.   N. FULTON   2,181,806
COIN HOLDER
Filed June 9, 1936   4 Sheets-Sheet 2
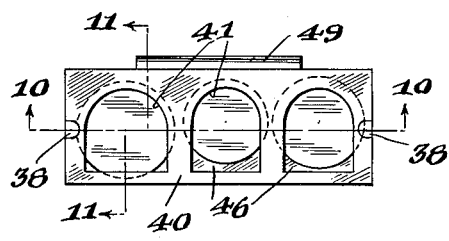
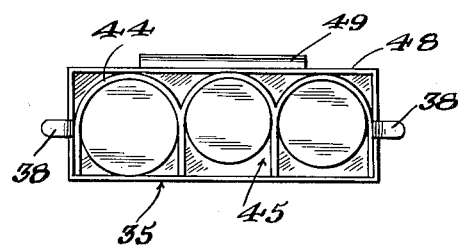
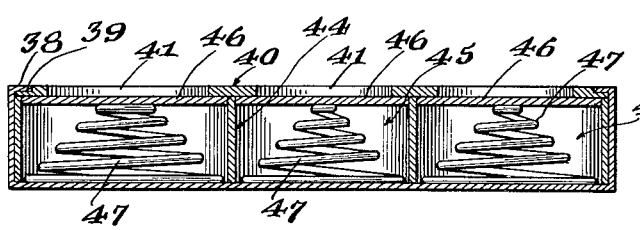
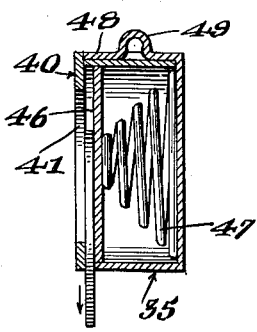
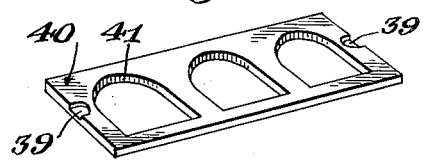
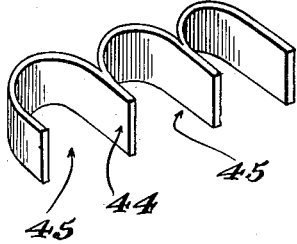
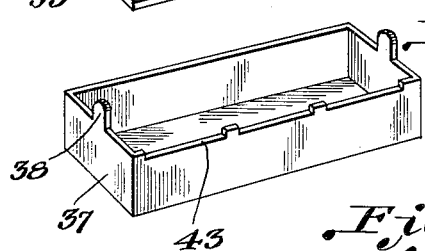
Inventor
Nell Fulton
By Emil F. Lange
Attorney Nov. 28, 1939. N. FULTON 2,181,806
COIN HOLDER
Filed June 9, 1936 4 Sheets-Sheet 3
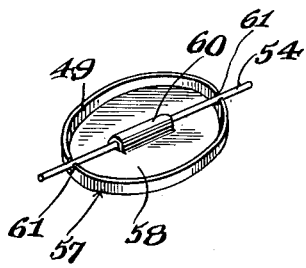
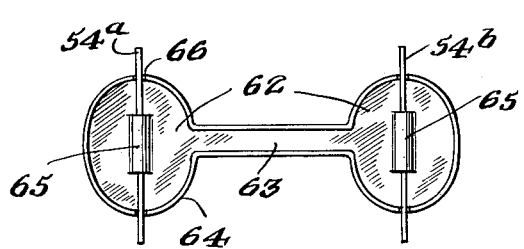
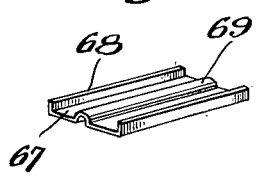
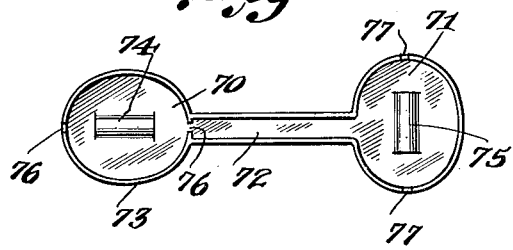
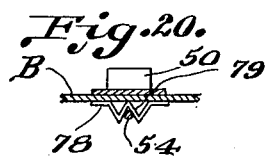
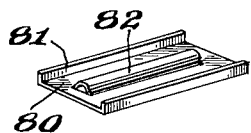
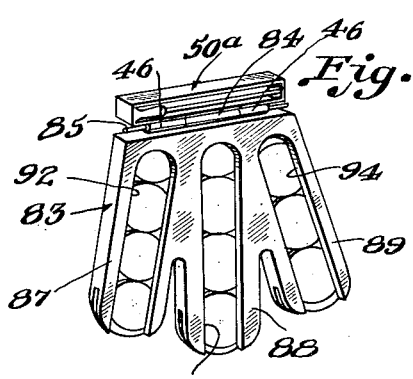
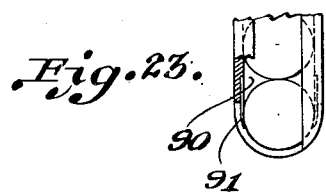
Inventor
Nell Fulton
By Emil F. Lange
Attorney

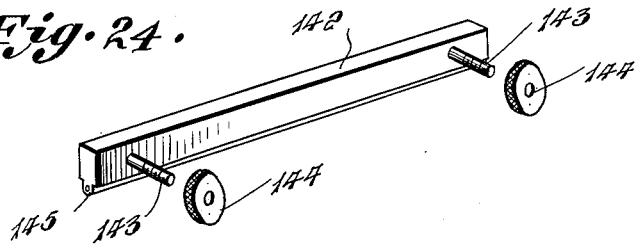
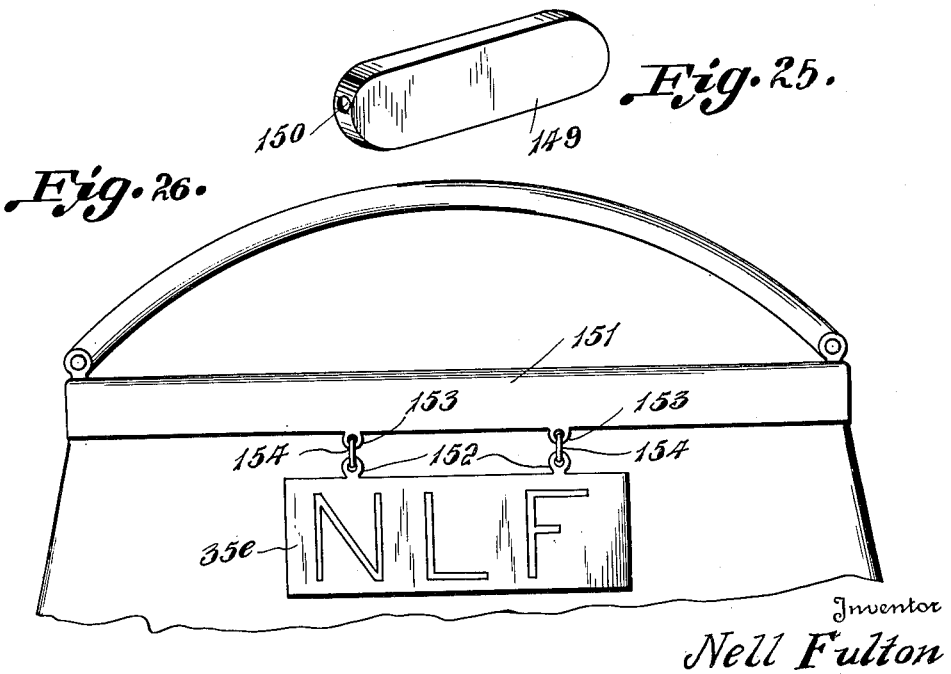

Patented Nov. 28, 1939

2,181,806

UNITED STATES PATENT OFFICE 2,181,806

COIN HOLDER

Nell Fulton, New York, N. Y.

Application June 9, 1936, Serial No. 84,358

1 Claim. (Cl. 133—6)

This invention relates to attachments for hand bags or pocket books and more particularly to a coin holder attachment which may be secured to the exterior of a conventional ladies' hand bag.

An object of this invention is to provide a small coin holder which may be secured to a hand bag in a position where the user may readily remove one or more small coins or tokens without the necessity of opening the bag and removing the coin or check from the interior.

Another object of this invention is to provide a coin holder for a hand bag which is not only a useful article but which has an ornamental appearance on the exterior of the bag.

A further object of this invention is to provide a coin or check holder which is so constructed that the coins inserted in the holder will not easily fall out so that the coins will not become lost by reason of the mounting of the holder on the exterior of the bag.

With the foregoing and other objects in view, the invention will be more fully described hereinafter, and will be more particularly pointed out in the claims appended thereto.

In the drawings, wherein like symbols refer to like or corresponding parts throughout the several views:

Figure 1 is a detail side elevation of a conventional hand bag having a coin holder constructed according to an embodiment of this invention mounted thereon.

Figure 2 is a detail perspective view of the holder showing the bottom portion thereof.

Figure 3 is a detail perspective view looking from one end of the holder with the attaching means.

Figure 4 is a perspective view from the front of the holder per se.

Figure 5 is a perspective view from the bottom of the holder.

Figure 6 is a perspective view of the holder attaching means.

Figure 7 is a longitudinal section taken substantially in the center of the holder attaching means.

Figure 8 is a detail rear elevation of the holder with coins or checks inserted therein.

Figure 9 is a view similar to Figure 8 with the inner face of the holder removed.

Figure 10 is an enlarged longitudinal section taken on the line 10—10 of Figure 8.

Figure 11 is an enlarged section taken on the line 11—11 of Figure 8.

Figure 12 is a perspective view of the rear plate of the holder.

Figure 13 is a perspective view of the casing for the holder.

Figure 14 is a perspective view of one of the followers for the coins.

Figure 15 is a perspective view of the coin guides.

Figure 16 is a perspective view of reinforcing plate adapted to be placed on the inside of the bag.

Figure 17 is a rear elevation of another form of reinforcing means.

Figure 18 is a perspective view of a further type of reinforcing means.

Figure 19 is a rear elevation of a further form of reinforcing means.

Figure 20 is an end elevation of a further form of reinforcing means.

Figure 21 is a perspective view of a further form of reinforcing means.

Figure 22 is a perspective view from the rear of a modified form of coin holder.

Figure 23 is a fragmentary rear elevation partly in section of one of the coin holding members embodied in Figure 22.

Figure 24 is an exploded perspective view of a modified form of attaching means for certain types of these coin holders.

Figure 25 is a perspective view of another form of reinforcing means for certain of the attaching means.

Figure 26 is a front elevation of a holder sesured to a hand bag and showing an additional form of attaching means for the holder.

Referring to the drawings and first to Figures 1 to 15 inclusive, the letter B designates generally a hand bag of conventional construction which is provided with a handle H. In order to provide a coin or check holder which may be secured to the exterior of the bag B, I have provided a casing 35 of substantially rectangular configuration which is provided on the front wall thereof with an ornamental construction 36. The end walls 37 of the casing 35 are provided with lugs 38 in substantially the center thereof and these lugs 38 are adapted to be bent over and seat in recesses 39 provided in a rear wall 40. The rear wall 40 is provided with a plurality of windows or openings 41 through which a finger may engage the outermost coin in order to move this coin through the lower wall 42 of the casing 35. Preferably, the lower wall 42 is provided with a plurality of cut out portions 43 so that coins may readily slide between the inner face of the rear wall 40 and the edge of the bottom wall 42.

A plurality of U-shaped coin guiding members 44 are secured to the inside of the receptacle 35 and as shown in Figure 15 these U-shaped coin guiding members are made in a series with the members integral one with another. These coin guiding members 44 define coin chambers 45 within the receptacle 35 and each chamber 45 has a follower 46 slidable therein and this follower 46 is constantly urged outwardly by a spring 47. As shown in the drawings, there are three of these coin chambers 45 but it will be understood that there may be more or less chambers depending only on the particular size of holder and the number of different sizes of coins or checks which are to be placed therein.

The casing or receptacle 35 at its upper wall 48 is provided with a barrel 49 which is struck out from the material of the wall 48 and is of a length substantially shorter than the length of the wall 48. A supporting member, generally designated as 50, for the casing 35 is provided with hinge barrels 51 along the lower edge thereof and a pintle 52 extends through the barrel sections 51 of the support 50 and through the barrel 49 so as to swingably support the coin holder from the side of the pocket book. The support 50 comprises a relatively rigid body 53 in the form of a rectangular casing which is open on its rear or inner side and a spring pressed pin 54 is secured to a pivot 55. A keeper 56 is carried by the casing 53 and is adapted to hold the pin 54 in locked position.

Referring now to Figure 16, the numeral 57 designates generally a reinforcing plate for use with the pin 54. This reinforcing member 57 comprises a flat plate 58 having a marginal flange 59 and a barrel 60 which is struck out from the plate 58 inside the flange 59. The flange 59 is also provided with aligned recesses 61 so that the pin 54 may extend straight through the barrel 60. This reinforcing plate may be used with the pin and supporting structure embodied in Figure 6 and associated views.

Figure 17 shows another form of reinforcing means for the inside of the pocket book and comprises a plate having a pair of oval or enlarged spaced apart portions 62 which are connected together by a connecting bar 63. A marginal flange 64 extends entirely about the marginal portions of the enlarged plate members 62 and the reinforcing or connecting bar 63. Each enlargement 62 is provided with a barrel 65 which is struck out from the central portion thereof and the flange 64 also has aligned recesses 66 so that the attaching pins 54a and 54b may extend straight through the barrels 65. These barrels 65 are disposed in parallel relation.

In Figure 18, there is shown a further type of reinforcing means in the form of a rectangular shaped plate 67 provided with longitudinal flanges 68 and a barrel 69 in the transverse center thereof. This type of reinforcing means is adapted to be used with the flanges 68 against the inside face of the wall of the bag.

In Figure 19 there is disclosed a reinforcing means similar to Figure 17 in which a pair of substantially oval plates 70 and 71 are connected by a connecting bar 72. The plates 70 and 71 and the connecting bar 72 have a marginal flange 73 about the outer edges thereof and the plate 70 has a barrel 74 extending lengthwise of the connecting bar 72, whereas the plate 71 has a barrel 75 extending transversely to the length of the connecting bar 72. The flange 73 has an opening 76 aligning with the barrel 74 and the flange 73 about the plate 71 has aligned openings 77 which align with the barrel 75.

In Figure 20 there is shown a further type of reinforcing means in which a plate 78 is provided with a substantially W-shape extending lengthwise thereof and the pin 54 is adapted to engage in the central portion 79 of this reinforcing plate.

In Figure 21 there is shown a reinforcing means similar to Figure 18 in which a plate 80 is provided with side flanges 81 and has a barrel 82 struck out from the center and this barrel 82 terminates at each end inwardly of the adjacent ends of the plate 80.

Referring now to Figures 22 and 23 the numeral 50a designates generally a pin structure similar to that shown in Figures 6 and 7. A coin holding casing 83 which is provided with a hinge barrel 84 is swingably secured to the supporting pin 50a by means of a pintle 85 which extends through barrel sections 86 carried by the pin structure 50a.

The coin holder 83 comprises a plurality of coin guiding arms 87, 88 and 89, which are formed integral one with another and the arm 87 has a coin receiving channel 90 which opens through the lower end of the arm 87. Coins in the channel 90 are held against dropping out by means of springs 91 as shown in Figure 23. The coin holding arm 88 has a similar channel and similar coin holding springs 91 and the coin holding arm 89 also has a like coin channel and coin holding springs. The rear side of the coin holding arm 89 has a longitudinally extending opening or slot 92 so that the coins in the channel 90 may be engaged by a finger and moved downwardly against the tension of the spring or springs 91. The arm 88 has a similar slot 93 and the arm 89 also has a slot 94 designed for the same purpose.

In this holder, that is the holder shown in Figures 22 and 23, the coins will gravitatingly move toward the lower end of the coin holding arms and the usual spring pressed followers are eliminated.

In the form shown in Figures 1 to 15 inclusive the coins are inserted in the coin chambers 45 by inserting the coins in the cutout portions 43 and first pressing the desired follower 46 inwardly. To remove the coins it is only necessary that a finger engage the desired coin through the opening 41 in the plate 40 and the coin then moved out through the opening 43. The coins may be removed by rocking the casing 35 outwardly of the bag B a sufficient distance to permit the insertion of a finger between the holder 35 and the side wall of the bag B.

Coins are removed from the holder shown in Figures 22 and 23 by rocking this holder 83 outwardly a slight distance and then engaging a finger in the selected slot and moving the finger downwardly so as to release the lowermost coin or coins from the spring or springs 91. The coins may be inserted in the channels 90 by using an instrument to force one of the springs 91 outwardly a sufficient distance to permit the coin to be forced upwardly in the channel.

The various types of coin holders here disclosed, and particularly the types which are adapted to be secured to the side of a hand bag by means of a clasp or supporting pin, such as the holders 35, 35c, 83 and 96, may be supported on the side of a hand bag by means of the attaching device shown in Fig. 24. The attaching device here shown comprises a bar 142 provided with threaded posts 143 which are adapted to be projected through the wall of the hand bag and fastened by means of nuts 144. The bar 142 is provided with a hinge barrel 145 on the lower edge thereof to receive a pintle extending through the hinge barrel carried by the upper edge of the coin holder.

In Fig. 25 there is disclosed a reinforcing body 149 provided with a hole 150 extending longitudinally therethrough, and this plate or body 149 is adapted to be used with the bar pin 50, the pin 54 thereof being passed through the hole 150 with the body 149 disposed on the inside of the bag. This member 149 will serve as a means to prevent tearing of the material of the bag by the pin 54.

Fig. 26 shows a further modification of the attaching means for the coin holder 35e, and in this form the frame 151 of the bag has a pair of eyes or rings 153 fixed thereto along the lower edge, and the holder 35e is provided with a pair of eyes or rings 152 on the upper edge. Links or rings 154 connect the rings or eyes 152 and 153 together so that the holder 35e may be freely swung upwardly to remove coins therefrom, and will normally be held in dependent relation on the outer side of the bag.

What is claimed is:

In a coin holder, a coin dispensing receptacle having coin accessible openings in its rear side and having a solid wall closing its front side, and a suspension device pivotally connected to the upper portion of the receptacle with the front side of the device facing in the same direction as that of the front side of the receptacle and the rear side having means therein for securement to a support whereby the receptacle normally rests with the coin accessible openings against the support and whereby it may be swung outwardly on the device for permitting ready access to the coins at the back of the receptacle.

NELL FULTON.